United States Patent
Geovanos et al.

(10) Patent No.: US 11,255,465 B2
(45) Date of Patent: Feb. 22, 2022

(54) MICROFLUIDIC CHECK VALVE AND RELATED DEVICES AND SYSTEMS

(71) Applicant: Agilent Technologies, Inc., Santa Clara, CA (US)

(72) Inventors: Ares Geovanos, San Francisco, CA (US); Hongfeng Yin, Cupertino, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 656 days.

(21) Appl. No.: 15/365,943

(22) Filed: Nov. 30, 2016

(65) Prior Publication Data
US 2018/0149289 A1    May 31, 2018

(51) Int. Cl.
  *F16K 99/00* (2006.01)
  *G01N 30/32* (2006.01)
  *G01N 30/60* (2006.01)

(52) U.S. Cl.
  CPC ...... *F16K 99/0057* (2013.01); *F16K 99/0005* (2013.01); *G01N 30/32* (2013.01);
  (Continued)

(58) Field of Classification Search
  CPC ......... Y10T 137/7909; Y10T 137/7908; F16K 99/0057; F16K 99/0005; F16K 2099/008;
  (Continued)

(56) References Cited

U.S. PATENT DOCUMENTS 2,268,592 A * 1/1942 Hothersall ............. F16N 37/02
                                                                141/27
3,550,616 A * 12/1970 Graham ................. F16K 15/00
                                                                137/513.7
(Continued)

FOREIGN PATENT DOCUMENTS

CN          1123355 A       5/1996
CN        103727273 A       4/2014
(Continued)

OTHER PUBLICATIONS

Extended European Search Report issued in counterpart EP Application No. 17200573.8 dated Feb. 1, 2018 (ten (10) pages).
(Continued)

*Primary Examiner* — Craig M Schneider
*Assistant Examiner* — Frederick D Soski
(74) *Attorney, Agent, or Firm* — Mannava & Kang, P.C.

(57) ABSTRACT

A microfluidic check valve includes an inlet bore, an internal chamber, an outlet bore, and a disk freely movable in the chamber between an open position and a closed position. At the open position, the disk permits fluid to flow from the inlet bore, through the chamber, and to the outlet bore. At the closed position, the disk prevents fluid from flowing in the reverse direction from the chamber into the inlet bore. The check valve may be positioned in-line with a fluid conduit, and/or incorporated with various fluidic devices such as, for example, capillary tubes, fittings, and chromatography columns. The check valve is capable of withstanding high fluid
(Continued)

pressures, while featuring a small swept volume, such as a nano-scale volume. The check valve may be utilized, for example, to prevent fluid back flow and isolate pressure pulses in fluid flow systems.

19 Claims, 11 Drawing Sheets

(52) U.S. Cl.
CPC ............... *F16K 2099/008* (2013.01); *F16K 2099/0084* (2013.01); *G01N 30/6026* (2013.01); *G01N 30/6095* (2013.01); *G01N 2030/322* (2013.01); *G01N 2030/328* (2013.01)

(58) Field of Classification Search
CPC ............ F16K 2099/0084; G01N 30/32; G01N 30/6026; G01N 30/6095; G01N 2030/322; G01N 2030/328
See application file for complete search history.

(56) References Cited

U.S. PATENT DOCUMENTS

| | | | | |
|---|---|---|---|---|
| 5,715,863 | A * | 2/1998 | Paczonay | ................. A45F 3/16 137/512 |
| 5,725,018 | A * | 3/1998 | Paczonay | ................. F16K 31/22 137/433 |
| 6,095,572 | A | 8/2000 | Ford et al. | |
| 7,600,533 | B2 | 10/2009 | Tai et al. | |
| 8,590,630 | B2 * | 11/2013 | Mathiesen | .......... E21B 33/1208 166/386 |
| 8,875,797 | B2 * | 11/2014 | Aakre | .................... E21B 34/08 166/386 |
| 9,435,773 | B2 | 9/2016 | Glatz et al. | |
| 2003/0019528 | A1 * | 1/2003 | Cotte | ........................ F15C 5/00 137/528 |
| 2007/0204918 | A1 * | 9/2007 | Weaver | ................ B65D 77/225 137/533.17 |
| 2008/0035875 | A1 * | 2/2008 | Tai | ..................... F16K 99/0005 251/318 |
| 2009/0301893 | A1 | 12/2009 | Cohen et al. | |
| 2010/0004635 | A1 | 1/2010 | Lin et al. | |
| 2013/0140270 | A1 | 6/2013 | Fai et al. | |

FOREIGN PATENT DOCUMENTS

| | | | |
|---|---|---|---|
| CN | 105874254 A | 8/2016 | |
| EP | 1296067 A2 | 3/2003 | |
| WO | 2008022048 A2 | 2/2008 | |
| WO | WO-2015087320 A1 * | 6/2015 | ....... B60K 15/03519 |

OTHER PUBLICATIONS

Chen, Po-Jui, et al. Floating-Disk Parylene Microvalves for Self-Pressure-Regulating Flow Controls. Journal of Microelectromechanical Systems, IEEE Service Center, vol. 7, No. 6. Dec. 1, 2008 (ten (10) pages).

Talusa, Eric S. et al.; "Effect of pressure pulses at the interface valve on the stability of second dimension colums in online comprehensive two-dimensional liquid chromatography." Journal of Chromatography A, 1378 pp. 50-57, (2015).

Chen, Po-Jui, et al.; "Floating-Disk Parylene Microvalve for Self-Regulating Biomedical Flow Controls"; Journal of Microelectromechanical Systems, IEEE Service Center, vol. 17, No. 6.; Dec. 31, 2008; pp. 1-4.

* cited by examiner

MICROFLUIDIC CHECK VALVE AND RELATED DEVICES AND SYSTEMS

TECHNICAL FIELD

The present invention generally relates to microfluidic check valves, as may be utilized to control fluid flow and pressure pulses in fluid flow systems such as, for example, liquid chromatography (LC) systems and other fluid flow systems utilized in analytical chemistry.

BACKGROUND

In a liquid chromatography (LC) system, a mobile phase consisting of one or more solvents is driven under a high system pressure through a separation unit, which often is provided in the form of a chromatography column. In high-performance LC (HPLC) systems and ultra high-performance LC (UHPLC) systems, the system pressure may be as high as, for example, about 1200 bar. The column contains a stationary phase, which in LC is typically provided in the form of a packed bed of particles such as, for example, silica beads. The particles are formulated and/or functionalized so as to separate different components (e.g., chemical compounds) of a sample. The sample to be so processed by the LC system is injected into the mobile phase at a point upstream of the column. The sample is then transported with the mobile phase through the column at the high system pressure. As the sample flows though the column, the sample contacts the stationary phase. The different components of the sample have different affinities for the stationary phase. This causes the different components to separate from each other in the liquid flow though the column. Consequently, the different components elute from the column outlet at different times. Hence, the flow of liquid outputted from the column contains a series of bands, each band consisting of a distinct component of the sample. That is, the bands respectively consist of the different components of the sample that were separated from each other by the column.

From the column outlet, the mobile phase and the series of bands carried therein flow to a detector configured to detect each individual band. As one example, the detector may include a flow cell through which the liquid flows, a light source, and a light detector configured to make optical-based measurements (e.g., absorbance) on the liquid flowing through the flow cell. Electrical signals produced by the detector may then be utilized to produce a chromatogram. Typically, the chromatogram plots signal intensity as a function of retention time, or alternatively as a function of retention volume. The data plot appears as a series of peaks corresponding to the series of respective bands detected by the detector. In analytical chromatography, the chromatogram is utilized to identify components in the sample and indicate their relative concentrations in the sample. Alternatively, in preparative chromatography the separating power of the column may be utilized to purify the sample, for example to isolate a target compound from other compounds contained in the sample.

The mobile phase and sample are driven by a pump positioned upstream of the column. The upstream pump develops the high system pressure. The fluid pressure at the column inlet (or column "head") is thus close to the high system pressure. Injection of the sample into the high-pressure mobile phase flow is often implemented using a multi-port injection valve. In one known configuration, the injection valve is switchable between a bypass mode and a main-pass mode. In the bypass mode, the injection valve routes the high-pressure mobile phase flow from the pump directly to the column. The injection valve is fluidly coupled to a sample loop. In the bypass mode, the injection valve fluidly isolates the sample loop from the high-pressure mobile phase flow, and the sample loop is at a much lower pressure such as atmospheric pressure. While in the bypass mode, an amount of the sample is loaded into the sample loop from a vial or other sample source. After the sample has been so loaded, the injection valve is switched to the main-pass mode. In the main-pass mode, the sample loop becomes part of the mobile phase flow path between the pump and the column. The mobile phase flows into the sample loop from one part of the injection valve, and the mobile phase and the sample flow from the sample loop, through another part of the injection valve, and to the column.

The switching of the injection valve from the bypass mode to the main-pass mode is immediately followed by a brief period of time during which the pump needs to pressurize the sample loop from low pressure up to the high system pressure to be able to deliver the sample with the mobile phase to the column. For a brief moment, the pressure at the column head downstream from the injection valve is higher than the pressure in the sample loop, i.e., a negative pressure differential is created (i.e., "negative" in the sense that the direction from high pressure to low pressure is the reverse of the intended direction of fluid flow). The pressure differential between the column head and the sample loop may be, for example, over 1000 bar. This situation can cause an expansion and back flow of the compressed fluid in the column and an associated pressure pulse. That is, fluid in the column flows or surges in the reverse direction back toward the lower-pressure sample loop. The back flow and associated pressure pulse can cause various problems, such as disturbing the stationary phase in the column, deteriorating the performance of the column, increasing sample dispersion, reducing the quality of the data acquired by the detector (e.g., peak broadening, peak tailing, etc.), and shortening the lifetime of the column. Therefore, it would be desirable to avoid the occurrence of the back flow and pressure pulse.

One known solution to this problem is to pre-pressurize the sample loop prior to valve switching. Another known solution is to modify the injection valve (i.e., extend the length of one of the valve grooves that fluidly couples two of the valve ports) so that the pump is fluidly coupled to the sample loop before the column head is fluidly coupled to sample loop. In this way, the pump would have a few milliseconds to pressurize the sample loop before the sample loop is switched into fluid communication with the high-pressure fluid line leading to the column. One example of a known sample injection system utilizing an injection valve is described in U.S. Pat. No. 9,435,773, the content of which is incorporated by reference herein in its entirety.

There is an ongoing need, however, to provide further solutions to the problems associated with back flow and pressure pulses in LC systems and other fluid flow systems, particularly solutions that do not require pre-pressurization of a sample loop or modification of an injection valve.

SUMMARY

To address the foregoing needs, in whole or in part, and/or other needs that may have been observed by persons skilled in the art, the present disclosure provides methods, processes, systems, apparatus, instruments, and/or devices, as described by way of example in implementations set forth below.

According to one embodiment, a microfluidic check valve includes a body, an inlet bore, an outlet bore, a plurality of bosses, and a disk. The body includes: a first outer surface; a second outer surface axially spaced from the first outer surface along a valve axis orthogonal to the first outer surface and the second outer surface; a first inside surface; a second inside surface axially spaced from the first inside surface; and a lateral surface disposed between the first inside surface and the second inside surface and surrounding the valve axis, wherein the first inside surface, the second inside surface, and the lateral surface define an internal chamber. The inlet bore is formed through the body from the first outer surface and communicates with the internal chamber. The outlet bore is formed through the body from the second outer surface and communicates with the internal chamber. The bosses are disposed on the second inside surface, wherein the bosses are spaced from each other. The disk is disposed in the internal chamber and is freely movable between an open position and a closed position in response to a pressure differential between the inlet bore and the outlet bore, wherein: at the open position, the disk contacts the bosses and establishes a fluid flow path from the inlet bore, through the internal chamber including between adjacent bosses, and to the outlet bore; and at the closed position, the disk contacts the first inside surface and blocks fluid flow from the inlet bore into the internal chamber.

According to another embodiment, a microfluidic check valve includes a body, an inlet bore, an outlet bore, and a disk. The body is composed of a material effective for withstanding a pressure of 100 bar or greater, and includes an internal chamber. The inlet bore is formed through the body and communicates with the internal chamber. The outlet bore is formed through the body and communicates with the internal chamber. The internal chamber, the inlet bore, and the outlet bore collectively have a nano-scale volume. The disk is disposed in the internal chamber and is freely movable between an open position and a closed position in response to a pressure differential between the inlet bore and the outlet bore, wherein: at the open position, the disk establishes a fluid flow path from the inlet bore, through the internal chamber, and to the outlet bore; and at the closed position, the disk blocks fluid flow from the inlet bore into the internal chamber.

According to another embodiment, a capillary tube includes: a microfluidic check valve according to any of the embodiments disclosed herein; and a capillary body comprising a capillary inlet end, a capillary outlet end, and a capillary bore extending from the capillary inlet end to the capillary outlet end. The microfluidic check valve may be mounted to the capillary inlet end such that the capillary bore communicates with the outlet bore. Alternatively, the microfluidic check valve may be mounted to the capillary outlet end such that the capillary bore communicates with the inlet bore.

According to another embodiment, a fluidic fitting includes: a microfluidic check valve according to any of the embodiments disclosed herein; and a fitting body comprising a fitting bore, wherein the microfluidic check valve is mounted to the fitting body such that the fitting bore communicates with the inlet bore.

According to another embodiment, a fluidic fitting includes: a microfluidic check valve according to any of the embodiments disclosed herein; a first fitting body comprising a first fitting bore; and a second fitting body comprising a second fitting bore, wherein the microfluidic check valve is mounted between the first fitting body and the second fitting body such that the first fitting bore communicates with the inlet bore and the second fitting communicates with the outlet bore.

According to another embodiment, a chromatographic column includes: a microfluidic check valve according to any of the embodiments disclosed herein; a column body comprising a column inlet end and a column outlet end, and an internal column bore extending from the column inlet end to the column outlet end; and an inlet end cap coupled to the column body at the column inlet end, wherein the microfluidic check valve is disposed in the inlet end cap such that the outlet bore communicates with the internal column bore.

According to another embodiment, a liquid chromatography system includes: a microfluidic check valve according to any of the embodiments disclosed herein; a pump configured for establishing a mobile phase flow toward a chromatographic column; a sample injector communicating with the pump at a point downstream from the pump; and a mobile phase line communicating with the sample injector and configured for communicating with the chromatographic column, wherein: the sample injector is configured for injecting a sample into the mobile phase flow such that the sample is transported in the mobile phase flow to the chromatographic column via the mobile phase line; the microfluidic check valve is located at a position selected from the group consisting of: a position in the mobile phase line between the injection valve and the chromatographic column; and a position in the chromatographic column; and the microfluidic check valve is oriented to prevent fluid flow in a direction from the chromatographic column toward the injection valve.

According to another embodiment, a liquid chromatography system includes: a microfluidic check valve according to any of the embodiments disclosed herein; a pump configured for pumping a mobile phase; a first mobile phase line communicating with the pump; a chromatographic column comprising a column inlet end; a second mobile phase line communicating with the column inlet end; and a sample injector comprising an injection valve and a sample loop communicating with the injection valve, wherein: the first mobile phase line and the second mobile phase line communicate with the injection valve; the sample injector is configured injecting a sample from the sample loop into the mobile phase such that the sample is transported in the mobile phase to the chromatographic column via the second mobile phase line; the microfluidic check valve is located at a position selected from the group consisting of: a position in the second mobile phase line between the injection valve and the chromatographic column; and a position in the column inlet end; and the microfluidic check valve is oriented to prevent fluid flow in a direction from the column inlet end toward the injection valve.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
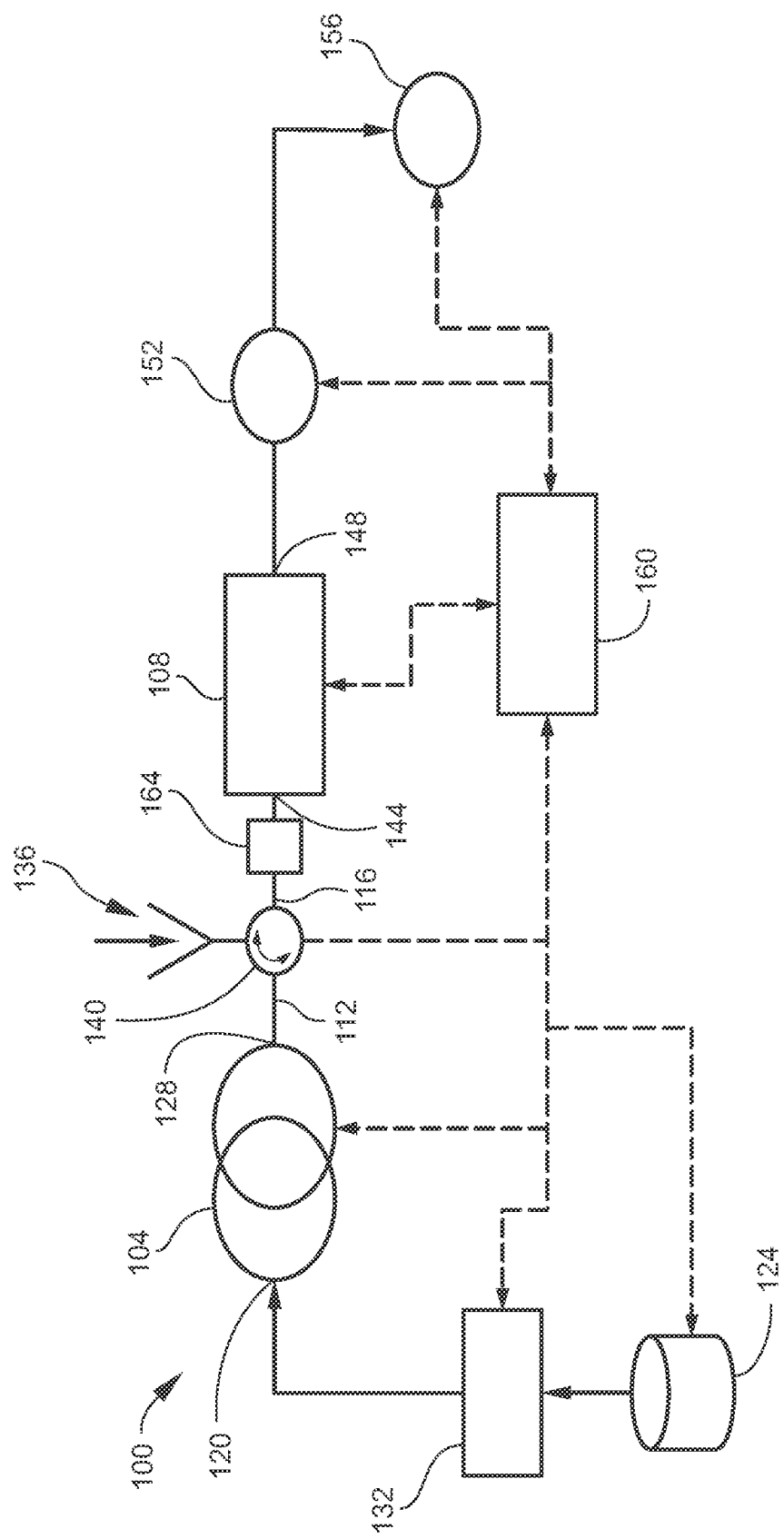
FIG. 1 is a schematic view of an example of a liquid chromatography (LC) system according to an embodiment.

As used herein, the term "fluid" is used in a general sense to refer to any substance that is flowable through a conduit. Thus, the term "fluid" may generally refer to a liquid, a gas, or a supercritical fluid, unless specified otherwise or the context dictates otherwise.

As used herein, the term "liquid" generally encompasses a liquid having a single-compound composition, or a mixture of two or more different liquids such as, for example, two or more different solvents. A liquid may be a solution, a suspension, a colloid, or an emulsion. Solid particles and/or gas bubbles may be present in the liquid.

As used herein, the term "conduit" generally refers to any type of structure enclosing an interior space that defines a repeatable path for fluid to flow from one point (e.g., an inlet of the conduit) to another point (e.g., an outlet of the conduit). A conduit generally includes one or more walls defining a tube or a channel. The cross-section (or flow area) of the tube or channel may be round (e.g., circular, elliptical, etc.) or polygonal (e.g., square, rectilinear, etc.). A tube or channel may also be referred to herein as a bore, a port, an inlet, or an outlet.

In some embodiments, the internal bore or lumen of a conduit may have a micro-scale cross-sectional dimension, i.e. a cross-sectional dimension on the order of micrometers (e.g., about 1000 μm (1 mm) or less). A tube of micro-scale cross-sectional dimension may be referred to herein as a capillary tube, or capillary. A channel of micro-scale cross-sectional dimension may be referred to herein as a "microfluidic channel" or "microchannel." As used herein, the term "capillary tube" and "microfluidic channel" also encompass a conduit that has a nano-scale cross-sectional dimension, i.e. a cross-sectional dimension on the order of nanometers (e.g., about 1000 nm (1 μm) or less). Thus, for example, the cross-sectional dimension of a micro-scale conduit may be in a range from about 100 nm to about 1000 μm. As used herein, the term "cross-sectional dimension" refers to a type of dimension that is appropriately descriptive for the shape of the cross-section of the conduit—for example, diameter in the case of a circular cross-section, major axis in the case of an elliptical cross-section, or a maximum length (or width or height) between two opposing sides in the case of a polygonal cross-section. Additionally, the cross-section of the conduit may have an irregular shape, either deliberately or as a result of the limitations of fabrication techniques. The cross-sectional dimension of an irregularly shaped cross-section may be taken to be the dimension characteristic of a regularly shaped cross-section that the irregularly shaped cross-section most closely approximates (e.g., diameter of a circle, major axis of an ellipse, length of a polygonal side, etc.). Fluid flow rates through a conduit of micro-scale cross-sectional dimension may be on the order of milliliters per minute (mL/min), microliters per minute (μL/min), or nanoliters per minute (nL/min).

As used herein, the term "line" (or fluid line) may refer to a single fluidic component that defines a fluid flow path from one point to another point, or two or more fluidic components that collectively define a fluid flow path. The fluidic components making up a given fluid line may be a combination of different types of fluidic components, wherein adjacent fluidic components are fluidly coupled to each other. Examples of fluidic components include, but are not limited to, conduits, chambers, flow cells, pumps, metering devices, valves, columns, flow controlling devices, fluid measurement (e.g., flow rate, pressure, temperature, concentration, etc.) devices, unions, flow combiners, and flow splitters.

As used herein, the term "microfluidic device" generally refers to a device having one or more micro-scale features such as micro-scale conduits.

According to an aspect of the present disclosure, a microfluidic check valve is provided. Various embodiments of the microfluidic check valve may have one or more of the following attributes: high-pressure capability (e.g., as high as about 1200 bar), very little or no fluid leakage over the range of operating pressures contemplated (e.g., as high as about 1200 bar), very low total internal volume (e.g., on the order of nanoliters), very low swept volume (e.g., on the order of nanoliters), low dead volume (e.g., on the order of nanoliters), fast switching between open and closed states (e.g., instantaneously or substantially instantaneously, or within a few microseconds), no cracking pressure (or substantially no cracking pressure) required to switch between the open and closed states, very low backpressure when in the open position, and high reliability and repeatable performance. In addition, embodiments of the microfluidic check valve may have a planar design that allows for integration both in microfluidic chip designs as well as in-line with existing instruments. Embodiments of the microfluidic check valve as disclosed herein may be utilized in any fluid flow system that requires or would benefit from one-way check valve functionality, particularly a fluid flow system that would benefit from a check valve having both high-pressure capability and nanoliter-scale swept volume. These attributes make the microfluidic check valve as disclosed herein particularly useful in fluid flow systems associated with analytical chemistry and fluid separation processes. As one non-exclusive example described in detail herein, the microfluidic check valve may be utilized in a liquid chromatography (LC) system to isolate a chromatography column from a sample loop at the moment a sample injection valve is switched from a bypass position (during which a sample is loaded into the sample loop) to a main-pass position (during which the sample is injected into a high-pressure mobile phase flow). The high-pressure capability of the microfluidic check valve enables it to survive the high-pressure operating regime of the LC system, and the nanoliter-scale swept volume of the microfluidic check valve prevents dispersion of the sample.

As a general matter, fluidic check valves are utilized throughout analytical chemistry both in high pressure pumps and in-line workflows. These known check valves fall into two categories: those that can withstand high pressure and those that cannot withstand high pressure. The check valves used in pumps are typically of the ball and spring type and are fabricated with a combination of metals and sapphire materials. In-line check valves made from metals and polymers often have a similar construction but operate at lower pressures. Both of these types of valves have large volumes that make them detrimental to analytical applications and difficult to realistically integrate into typical workflows. Microfluidic check valves, which typically are made from polymers, can have volumes in the nanoliter range but cannot withstand high pressures or flows.

By comparison, a microfluidic check valve as disclosed herein is capable of reliably and repeatedly functioning at high pressures while maintaining a very small volume. Thus, a microfluidic check valve as disclosed herein enables the use of check valves to be expanded into the analytical chemistry space.

FIG. 1 is a schematic view of an example of a liquid chromatography (LC) system 100 according to an embodiment. The LC system 100 may be a high-performance LC (HPLC) system or an ultra high-performance LC (UHPLC) system, as appreciated by persons skilled in the art. The LC system 100 represents one non-exclusive example of an environment in which a microfluidic check valve as disclosed herein may be implemented.

The LC system 100 includes a pump 104 configured for pumping a mobile phase along a mobile phase flow path at high pressure (or system pressure) to a chromatographic column 108. In the present context, examples of "high pressure" include, but are not limited to, a range of 100 bar or greater, from 100 bar to 1200 bar, a range from 200 bar to 1200 bar, and a range from 500 bar to 1200 bar. The mobile phase flow path may be defined by various fluid conduits, such as a first mobile phase line 112 and a second mobile phase line 116, and components operatively communicating with or switchable into communication with such mobile phase lines 112 and 116. The pump 104 includes a pump inlet 120 communicating with a solvent supply source 124, and a pump outlet 128 communicating with the first mobile phase line 112. The mobile phase may include a single type of solvent or a mixture of two or more different solvents.

The pump 104 may include two or more individual pumping units arranged in parallel and/or in series. The individual pumping units often are reciprocating piston-type pumping units, i.e., each pumping unit includes a respective piston driven to reciprocate in a respective pump chamber. As one example, the pump 104 may have a quaternary configuration in which a first dual in-line pumping module is arranged in parallel with a second dual in-line pumping module. Each dual in-line pumping module includes a primary pumping unit and a secondary pumping unit arranged in series, whereby the outlet of the primary pumping unit communicates with the inlet of the secondary pumping unit. With the quaternary configuration, the illustrated pump inlet 120 is defined by the two parallel inlets of the respective primary pumping units of the two dual in-line pumping modules, and the illustrated pump outlet 128 is defined by the two parallel outlets of the respective secondary pumping units of the two dual in-line pumping modules. The primary pumping unit intakes solvent, pressurizes the solvent to high pressure, and delivers the solvent to the secondary pumping unit during the intake stroke of the secondary pumping unit. The relative phases of piston motion of the primary pumping unit and the secondary pumping unit may be set (e.g., about 180 degrees offset from each other) such that during the intake stroke of the secondary pumping unit, a first portion of the solvent delivered by the primary pumping unit fills the chamber of the secondary pumping unit while a second portion of the solvent delivered by the primary pumping unit is outputted through the outlet of the secondary pumping unit. Subsequently, the secondary pumping unit during its discharge stroke outputs the remaining (first) portion of the solvent through the outlet of the secondary pumping unit.

A dual in-line pumping module is useful for delivering solvent(s) at a highly controllable constant or varied flow rate with minimal pressure pulses. The quaternary configuration is useful for delivering two different solvents (e.g., solvent A and solvent B) so that they can be mixed in an appropriate mixing unit (not shown) on the high-pressure outlet side of the pump 104. In this case, the pump outlet 128 (the parallel outlets of the two dual in-line pumping modules) delivers solvent A and solvent B to the mixing unit, which communicates with the first mobile phase line 112. Additional pumping modules (such as additional dual in-line pumping modules) may be provided to deliver additional solvents. Thus, the composition of the mobile phase supplied to the first mobile phase line 112 may include two or more solvents. The pump 104 (pumping units) may be operated in an isocratic mode in which the solvent composition of the mobile phase is kept constant over time, or in a gradient mode in which the solvent composition is varied over time. As an example of the gradient mode, the amount of solvent A in the mobile phase may be ramped from 100% to 0% over a predetermined period of time while the amount of solvent B in the mobile phase is ramped from 0% to 100% over a predetermined period of time.

When two or more solvents are to be utilized, the solvent supply source 124 may include two or more solvent reservoirs that communicate with respective pumping modules via respective solvent supply lines. As illustrated in FIG. 1, a degasser 132 may be provided in the solvent supply line(s) to remove dissolved gases from the solvent stream(s).

In an alternative embodiment, two or more solvents may be mixed on the lower-pressure inlet side of the pump 104, in which case the pump 104 may include a single pumping module (such as a dual in-line pumping module). In this case, a proportioning valve (not shown) may be provided between the pump inlet 120 and the solvent supply source 124. The proportioning valve is configured to receive flows of the different solvents from the reservoirs of the solvent supply source 124, and output them in the desired proportions (according to either the isocratic mode or gradient mode) to the pump inlet 120.

The LC system 100 further includes a sample injector 136 configured to inject a sample to be analyzed into the mobile phase flow path, such that the sample is transported in the mobile phase to the column 108 and driven through the column 108 at the high system pressure. The sample injector 136 includes an injection valve 140 communicating with the first mobile phase line 112 and the second mobile phase line 116. An example of the sample injector 136 is described further below.

The column 108 includes a column inlet 144 communicating with the second mobile phase line 116 and a column outlet 148 communicating with a detector 152. The column 108 may include a stationary phase as described above, through which the sample and the mobile phase are driven. As described above, different compounds of the sample have different degrees of affinity for the stationary phase and thus are retained differently by the stationary phase. As a result, as the sample flows through the stationary phase, the different compounds travel at different speeds and becomes become separated from each other, and thus reach the column outlet 148 at different times, eluting from the column outlet 148 in distinct bands. The detector 152 is configured to detect these bands and output electrical signals from which a chromatogram representative of the sample under analysis may be produced. In some embodiments, the fluidic output of the detector 152 may be directed to a fractionating unit 156 configured to collect the separated compounds as respective fractions of the sample.

As further illustrated in FIG. 1, the LC system 100 may further include a system controller 160 (or computing device) configured for controlling, monitoring, and/or synchronizing the operations of various components of the LC system 100. The controller 160 may be configured for receiving measurement signals from various measurement devices (e.g., pressure sensors, flow rate sensors, temperature sensors, etc.) and take responsive actions as needed as part of controlling the LC system 100. The controller 160 may also be configured for receiving the measurement signals from the detector 152 and performing tasks relating to data acquisition and signal analysis as necessary to generate chromatograms. The controller 160 may also be configured for providing and controlling a user interface that provides screen displays of chromatographic data and other data with which a user may interact. One or more modules of the controller 160 may be, or be embodied in, for example, a computer workstation, desktop computer, laptop computer, portable computer, tablet computer, handheld computer, mobile computing device, personal digital assistant (PDA), smartphone, etc. The controller 160 may include one or more reading devices on or in which a non-transitory or tangible computer-readable (machine-readable) medium may be loaded that includes instructions for performing all or part of any of the methods disclosed herein. The controller 160 may be in electrical communication with various components of the LC system 100 via wired or wireless communication links, as represented by dashed lines in FIG. 1. The controller 160 may include one or more types of hardware, firmware and/or software, as appreciated by persons skilled in the art.

As further illustrated in FIG. 1, the LC system 100 includes a microfluidic check valve 164 operatively communicating with the mobile phase flow path between the sample injector 136 and the column 108. For example, the microfluidic check valve 164 may be positioned in-line with the second mobile phase line 116 between the injection valve 140 and the column inlet 144. In one embodiment, the microfluidic check valve 164 may be integrated with the end of a capillary tube that is part of the second mobile phase line 116. In another embodiment, the microfluidic check valve 164 may be integrated with a fluidic fitting that fluidly couples two capillary tubes of the second mobile phase line 116, or fluidly couples a capillary tube with the column inlet 144. In some embodiments, such a fluidic fitting may be a microfluidic fitting. In another embodiment, the microfluidic check valve 164 may be integrated with the column inlet 144, such as in an end cap of the column 108. The microfluidic check valve 164 is described further below.

Figure 2:
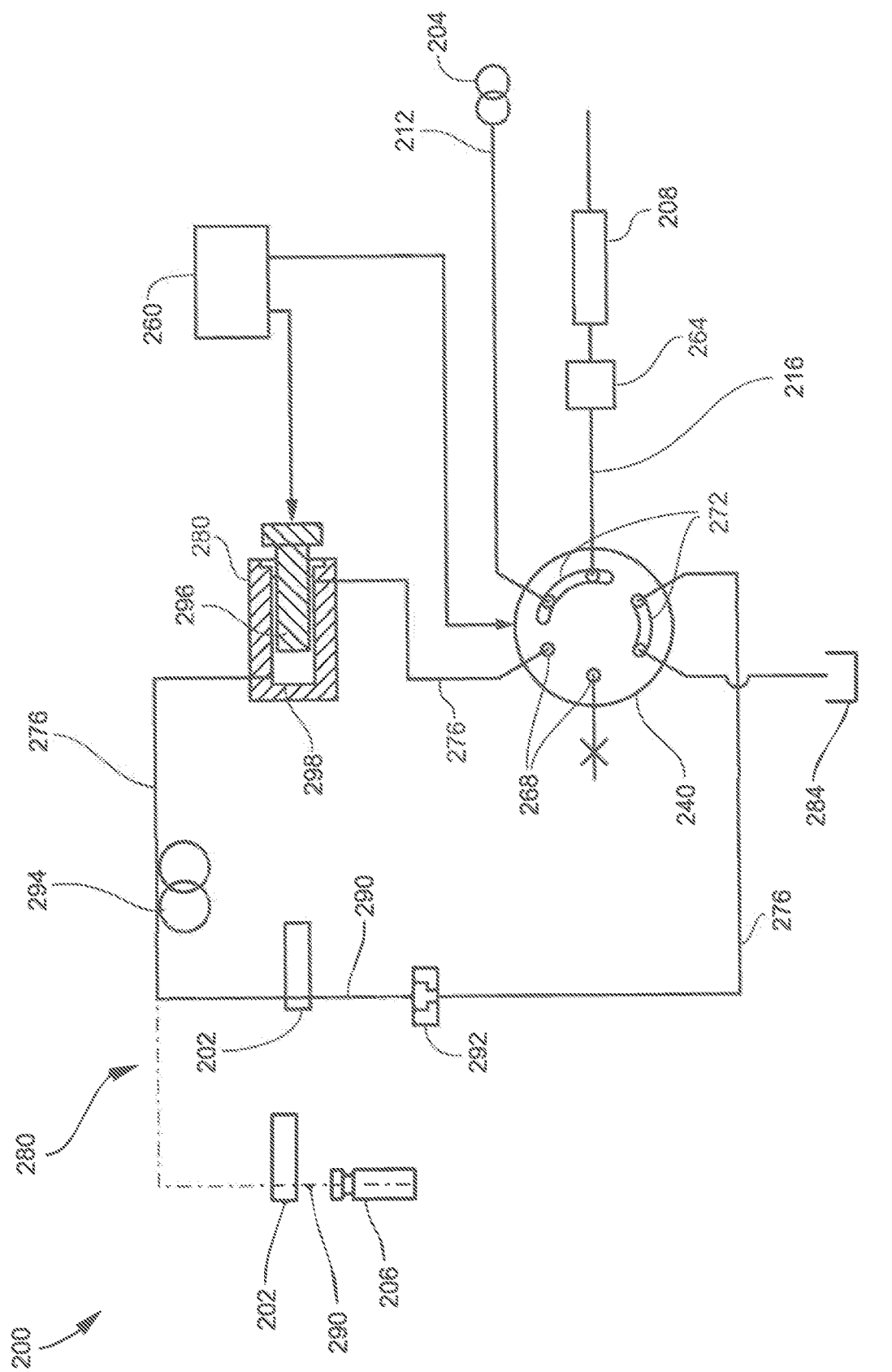
FIG. 2 is a schematic view of an example of a sample injector according to an embodiment disclosed herein, illustrating the sample injector in a bypass mode.

FIG. 2 is a schematic view of an example of a sample injector 200 according to an embodiment. The sample injector 200 may be utilized in an LC system such as the LC system 100 described above and illustrated in FIG. 1.

The sample injector 200 includes an injection valve 240, which is configured to switch among different fluid flow paths made available by different fluid conduits coupled to ports of the injection valve 240. In the illustrated embodiment, the injection valve 240 is a 6-port rotary injection valve. The injection valve 240 includes six ports 268 and two or more arcuate channels or grooves 272. One of the ports 268 is not utilized in the present embodiment and thus is blocked, as indicated by an X. The body of the injection valve 240 includes a stationary portion and a rotary portion that is drivable to rotate in an indexed manner (by a suitable motorized drive mechanism, not shown) relative to the stationary portion. The injection valve 240 is thus capable of selectively switching to multiple valve positions. Either the stationary portion or the rotary portion includes the ports 268, and the other portion includes the grooves 272. The grooves 272 are sized and shaped such that at any valve position, each groove 272 fluidly couples a pair of adjacent ports 268, one of which serves as an inlet port leading into the groove 272 while the other serves as an outlet port leading out from the groove 272. At different valve positions, each groove 272 fluidly couples a different pair of adjacent ports 268. By this configuration, different flow paths going into and out from the injection valve 240 can be defined, depending on which pairs of ports 268 have been fluidly coupled by which grooves 272.

In the present embodiment, one port 268 of the injection valve 240 is coupled to a first mobile phase line 212 of the associated LC system. The first mobile phase line 212 is in turn coupled to a pump 204 of the LC system. Another port 268 is coupled to a second mobile phase line 216, which is in turn coupled to a chromatographic column 208 of the LC system. These components of the LC system may be as described above and illustrated in FIG. 1. Two other ports 268 are coupled to respective fluid conduits 276 that are part of a sample loop (or "split" loop) 280 of the sample injector 200. Another port 268 is coupled to a waste line leading to a waste receptacle 284.

The sample loop 280 includes a metering device 288, an injection needle 290, a needle seat 292, and a number of fluid conduits 276 providing fluid communication between these components and the corresponding ports 268 of the injection valve 240. The sample loop 280 may also include a looped section 294, which may be part of the fluid conduit 276 that couples the metering device 288 to the injection needle 290. The looped section 294 provides additional volume in the sample loop 280 to accommodate an amount of sample loaded into the sample loop 280. The metering device 288 is configured to precisely draw a predetermined amount of sample into the sample loop 280. For this purpose, in the present embodiment the metering device 288 is provided in the form of a piston 296 drivable by a suitable motorized drive mechanism (not shown) to alternately translate in a forward direction and a backward direction (to the left and to the right, from the perspective of FIG. 2) in a piston chamber 298.

As also illustrated in FIG. 2, the sample injector 200 includes a needle drive device 202 configured to seat the injection needle 290 into the needle seat 292 in a fluid-sealed manner. The needle drive device 202 is also configured to unseat the injection needle 290, move it to a sample container 206, and insert it therein to enable the drawing of sample from the sample container 206 into the sample loop 280. The operations of the injection valve 240, the metering device 288, and the needle drive device 202 may be controlled by a system controller 260, which may correspond to the system controller 160 described above and illustrated in FIG. 1. FIG. 2 further illustrates a microfluidic check valve 264, examples of which are described in detail elsewhere herein.

FIG. 2 illustrates the sample injector 200 in a bypass mode, which corresponds to a distinct bypass position of the injection valve 240. In the bypass mode (position), the injection valve 240 couples the first mobile phase line 212 directly with the second mobile phase line 216, thereby defining a high-pressure mobile phase flow path by which the pump 204 drives the mobile phase (without sample) directly to the column 208. The sample loop 280 is thus bypassed, and is fluidly isolated from the high-pressure mobile phase flow path. In this mode, the sample loop 280 is in a low-pressure state, for example at about atmospheric pressure (i.e., about 1 bar), which facilitates "breaking" or "splitting" the sample loop 280 at the needle seat 292 to enable loading the sample into the sample loop 280, as well as providing fluid communication between the sample loop 280 and the waste receptacle 284. Specifically, to load the sample, the needle drive device 202 is operated to unseat the injection needle 290, move it to the sample container 206, and immerse it in the sample contained in the sample container 206. The metering device 288 is then operated to draw a predetermined amount of sample from the sample container 206 into the sample loop 280, including the looped section 294 if provided. In the present embodiment, the piston 296 is retracted (in the rightward direction, from the perspective of FIG. 2) to create suction by which the sample is drawn into the sample loop 280. The needle drive device 202 is then operated to move the injection needle 290 back to the needle seat 292 and reseat the injection needle 290 therein, thereby reclosing the sample loop 280. The sample is then ready to be injected into the high-pressure mobile phase flow.

As also illustrated in FIG. 2, in the bypass mode the sample loop 280 communicates with the waste receptacle 284 via a pair of fluidly coupled ports 268 of the injection valve 240. The waste receptacle 284 may be utilized at various stages of operation of the sample injector 200 as a destination site for excess column effluent, rinse solutions, etc.

Figure 3:
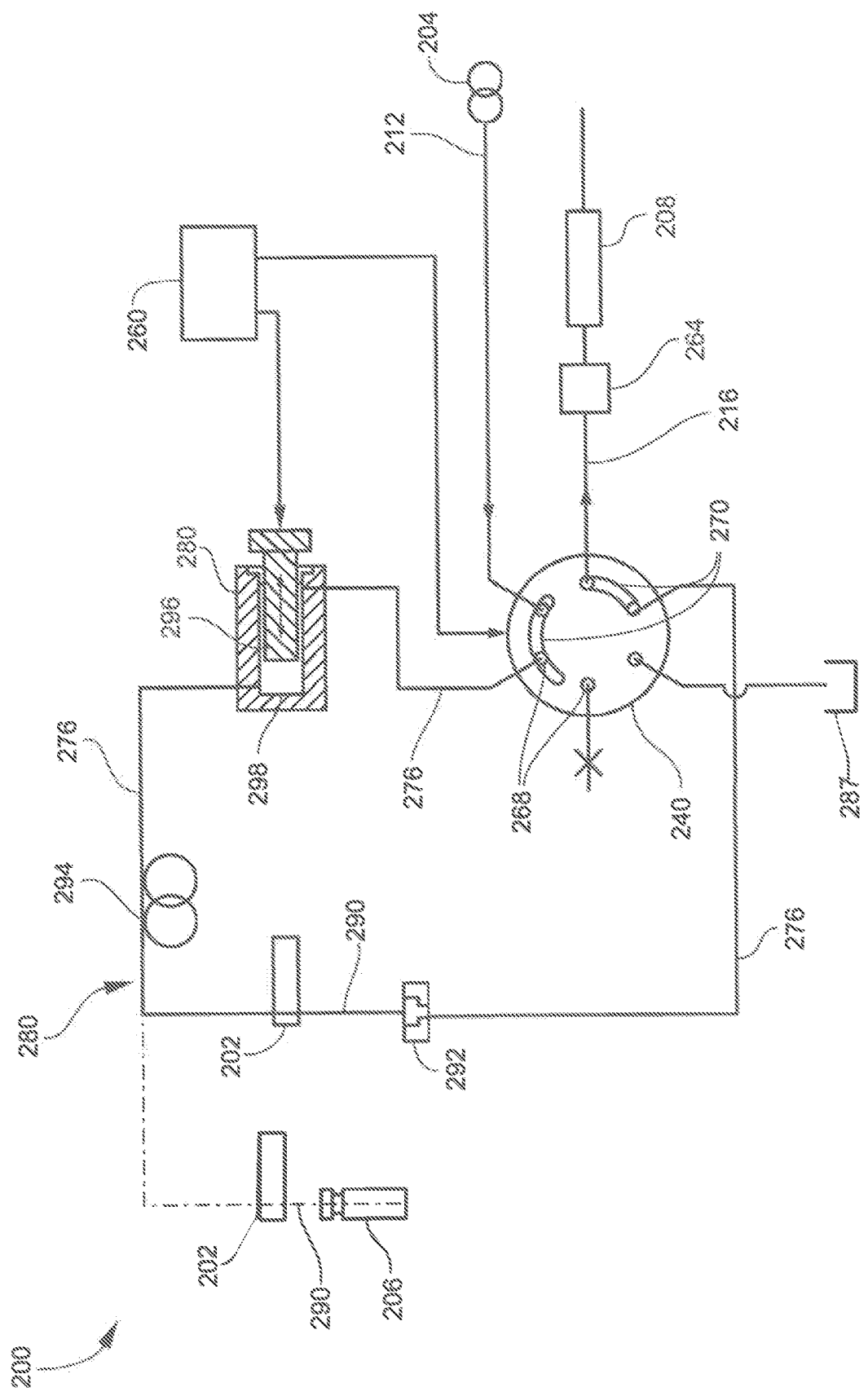
FIG. 3 is a schematic view of the sample injector illustrated in FIG. 2, after the sample injector has been switched to a main-pass mode.

FIG. 3 is a schematic view of an example of a sample injector 200 after the sample injector 200 has been switched to a main-pass mode, which corresponds to a different position of the injection valve 240 in comparison to the bypass mode illustrated in FIG. 2. In the main-pass mode (position), the injection valve 240 couples the first mobile phase line 212 with the sample loop 280, specifically the fluid conduit 276 leading from the injection valve 240 to the inlet of the metering device 288. The injection valve 240 also couples the other end of the sample loop 280, specifically the fluid conduit 276 leading from the seated injection needle 290 to the injection valve 240, to the second mobile phase line 216. The waste receptacle 284 is isolated from the sample loop 280 and thus is not active during the main-pass mode. The sample loop 280 containing the sample is now part of the high-pressure mobile phase flow path between the pump 204 and the column 208 of the LC system. Thus in the main-pass mode, the pump 204 drives the mobile phase into the sample loop 280 and thereby into contact with the sample, and drives the mobile phase now carrying the sample (components of which may now be dissolved in the mobile phase) into the column 208 for chromatographic separation.

As described above, when the injection valve 240 is in the bypass position (FIG. 2), the pressure at the head (inlet) of the column 208 is close to the pump discharge pressure, for example in a range of 100 bar to 1200 bar, while the sample loop 280 is at about atmospheric pressure (i.e., about 1 bar). When the injection valve 240 is then switched to the main-pass position (FIG. 3), the pump 204 is abruptly placed into fluid communication with the sample loop 280, and needs some time to pressurize the sample loop 280 to pump pressure before it can deliver the sample-laden mobile phase to the column 208. For a brief moment, the column head pressure is higher than the sample loop pressure. In effect, during this brief moment, the column 208 is pressurizing the sample loop 280 instead of the pump 204 pressurizing the sample loop 280, and a negative pressure pulse is created in the direction from the column 208 to the sample loop 280. This can cause fluid in the column 208, which is now expanding due to decompression, to back flow from the column head toward the injection valve 240, i.e., flow reversal occurs, which is undesirable as described above.

According to an aspect of the present disclosure, the problem of back flow and pressure pulse attending the switching of the injection valve 240 from the bypass position to the main-pass position is eliminated by providing a microfluidic check valve (e.g., the microfluidic check valve 164 in FIG. 1, or the microfluidic check valve 264 in FIGS. 2 and 3) in the mobile phase flow path between the injection valve (140 or 240) and the column (108 or 208), or at (or in) the head of the column. The microfluidic check valve is oriented to permit fluid flow in the direction from the injection valve 240 to the column 208, and to prevent back flow in the direction from the column 208 to the injection valve 240. Notably, the presently disclosed microfluidic check valve is capable of functioning without failure in high-pressure regimes, such as encountered in an LC system as described above in conjunction with FIGS. 1-3, while having a nanoliter-scale swept volume. Moreover, the microfluidic check valve may have other advantageous attributes as described above.

Figure 4:
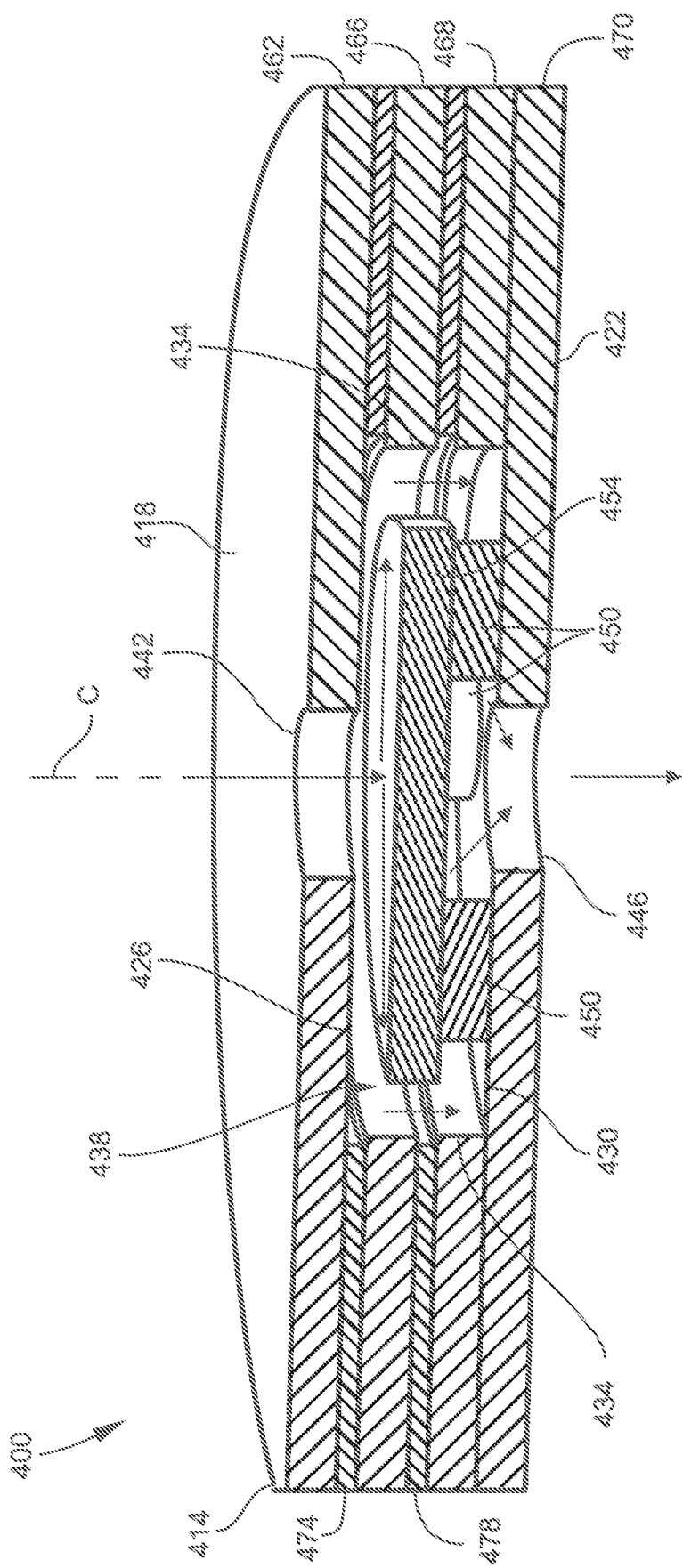
FIG. 4 is a cross-sectional view of an example of a microfluidic check valve according to an embodiment, illustrating the microfluidic check valve in an open position.

FIG. 4 is a schematic cross-sectional view of an example of a microfluidic check valve 400 according to an embodiment. The structure of the microfluidic check valve 400 may have a central axis of symmetry, or valve axis, C. The microfluidic check valve 400 includes a body 414 that has a planar geometry. In a typical but not exclusive embodiment, the body 414 is shaped as a disk, The body 414 includes a first outer surface 418, and a second outer surface 422 axially spaced from the first outer surface 418 along the valve axis C and parallel to the first outer surface 418. The valve axis C is orthogonal to the first outer surface 418 and the second outer surface 422. Thus, the axial distance from the first outer surface 418 to the second outer surface 422 defines the overall axial thickness of the body 414 (and thus the microfluidic check valve 400). The body 414 further includes a first inside surface 426, and a second inside surface 430 axially spaced from the first inside surface 426 along the valve axis C and parallel to the first inside surface 426. The body 414 further includes a lateral inside surface 434 disposed between and adjoining the first inside surface 426 and the second inside surface 430, and surrounding the valve axis C. The first inside surface 426, second inside surface 430, and lateral inside surface 434 cooperatively define an internal chamber 438 in the body 414. The lateral inside surface 434 is parallel to the valve axis C and thus defines the axial height of the internal chamber 438. In a typical embodiment, the lateral inside surface 434 is cylindrical whereby the internal chamber 438 is cylindrical or disk-shaped and has a diameter defined by the diameter of the lateral inside surface 434. The body 414 further includes a fluid inlet port or bore 442 extending through the body 414 from the first outer surface 418 to the internal chamber 438, and a fluid outlet port or bore 446 extending through the body 414 from the second outer surface 422 to the internal chamber 438. In a typical embodiment, the inlet bore 442 and the outlet bore 446 are centered on the valve axis C.

The microfluidic check valve 400 further includes a plurality of posts or bosses 450 disposed on (or extending from) the second inside surface 430 and thus disposed in the internal chamber 438. In one non-limiting embodiment, the bosses 450 are circumferentially spaced from each other about the valve axis C at equal arcuate distances, and are spaced at equal radial distances from the valve axis C. In a typical embodiment, the bosses 450 are cylindrical or disk-shaped. The present embodiment includes four bosses 450 (only three of which are shown in FIG. 4) circumferentially spaced at ninety-degree intervals from each other about the valve axis C.

The microfluidic check valve 400 further includes a floating disk 454 disposed in the internal chamber 438. The diameter of the disk 454 is greater than the diameters of the inlet bore 442 and the outlet bore 446. The diameter of the disk 454 is also greater than the diameter (in the plane transverse to the valve axis C) of the region of the internal chamber 438 inscribed by the circular pattern of bosses 450, but is less than the outermost diameter of the internal chamber 438 (as defined by the lateral inside surface 434). The disk 454 is "floating" in that it is freely movable in the internal chamber 438 and is not attached to any other part of the microfluidic check valve 400. The disk 454 is movable between an open position and a closed position in response to the fluid pressure differential between the inlet bore 442 and the outlet bore 446.

FIG. 4 illustrates the microfluidic check valve 400 in the open position. The fluid pressure at the inlet bore 442 is higher than at the outlet bore 446, such that the disk 454 is forced to move into abutting contact with the bosses 450. In the open position, fluid flows through the inlet bore 442 into the internal chamber 438, through the internal chamber 438 and out through the outlet bore 446. As the fluid flows through the internal chamber 438, the fluid flows around the disk 454, and around and between the bosses 450, as depicted by arrows in FIG. 4. FIG. 4 thus illustrates the desired condition of a positive pressure differential by which fluid flows in the intended forward direction.

Figure 5:
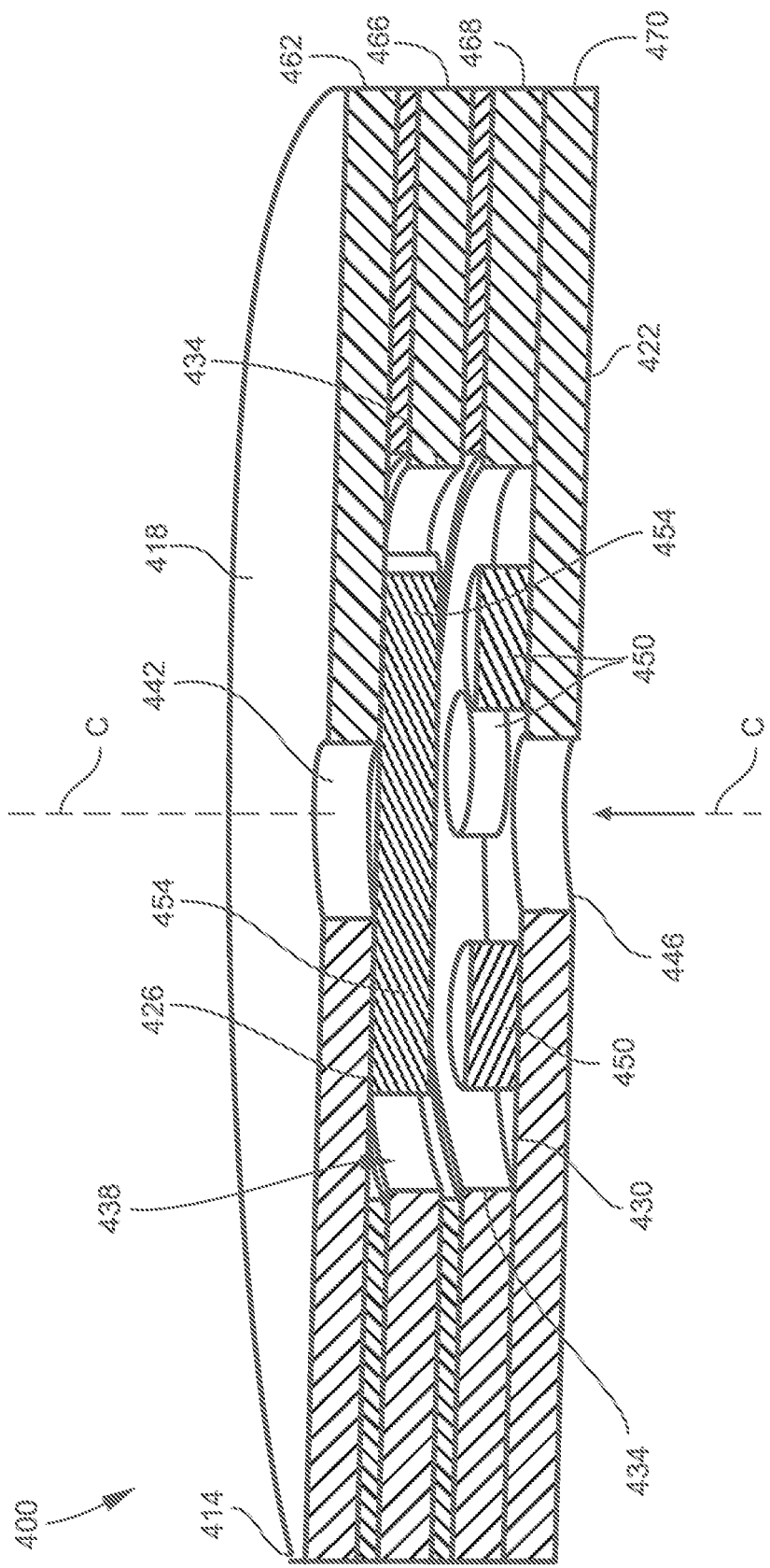
FIG. 5 is a cross-sectional view of the microfluidic check valve illustrated in FIG. 4, illustrating the microfluidic check valve in a closed position.

By comparison, FIG. 5 is a schematic cross-sectional view of the microfluidic check valve 400 in the closed position. In this case, the fluid pressure at the inlet bore 442 is lower than at the outlet bore 446, such that the disk 454 is forced to move into abutting contact with the first inside surface 426, thereby blocking the inlet bore 442. Consequently, fluid flowing in the reverse direction into the internal chamber 438 via the outlet bore 446 is prevented from flowing through the inlet bore 442, as depicted by arrows and an X in FIG. 5. When utilized in an LC system as described herein, the disk 454 may move from the open position to the closed position at or shortly after the point in time when the injection valve switches from the bypass mode to the main-pass mode.

Figure 6:
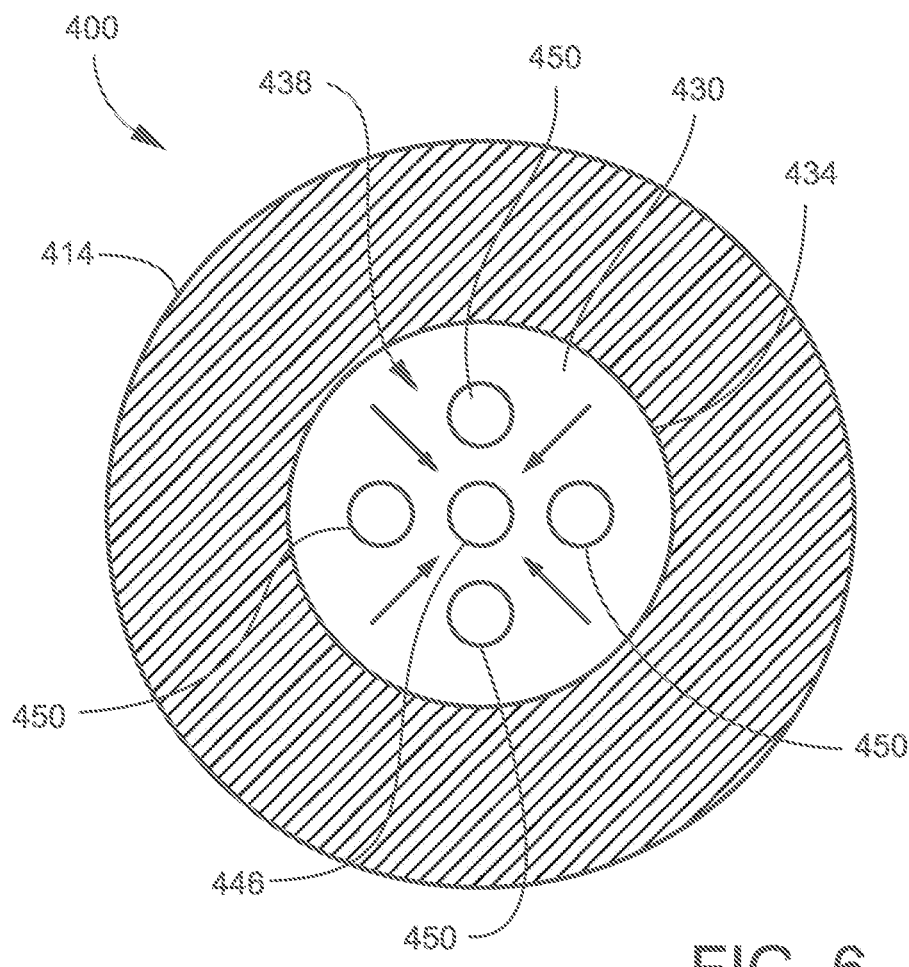
FIG. 6 is a cutaway view of the microfluidic check valve illustrated in FIGS. 4 and 5.

FIG. 6 is a cutaway, view of the microfluidic check valve 400. The cutaway is taken through the transverse plane at the interface between the disk 454 and the bosses 450 (FIG. 4), whereby the top surfaces of the bosses 450 are viewable. The arrows depict flow paths in the internal chamber 438 that run between pairs of adjacent bosses 450 toward the outlet bore 446. in the case of a back flow, the direction of the arrows may be reversed. However, such back-flowing fluid would be prevented by the overlying disk 454 from flowing to the inlet bore 442, as described above in conjunction with FIG. 5.

The microfluidic check valve 400 thus allows fluid flow in the desired direction, i.e. from the inlet bore 442 to the outlet bore 446, while preventing back flow in the reverse direction. By moving to the closed position to prevent back flow, the microfluidic check valve 400 also isolates the upstream side of the microfluidic check valve 400 from any pressure pulses developed on the downstream side. The respective geometries and sizes of the body 414, the bosses 450, and the disk 454 are configured such that the disk 454 can freely move around the internal chamber 438 without jamming against or becoming stuck to the bosses 450 or any of the surfaces defining the internal chamber 438. Moreover, the disk 454 can move laterally (i.e., in the transverse plane) and still function to switch between the fully open and fully closed positions.

The respective diameters of the inlet bore 442 and the outlet bore 446 may be the same or different, as needed for fluidly coupling the inlet side and the outlet side of the microfluidic check valve 400 to respective upstream and downstream fluidic components. In a typical embodiment, the inlet bore 442, the outlet bore 446, and the disk 454 have respective diameters on the order of micrometers ($\mu$m), i.e. in a range of about 1000 micrometers or less. As a few non-limiting examples, the diameters of the inlet bore 442 and the outlet bore 446 may be 120 $\mu$m, 190 $\mu$m, or 500 $\mu$m. The body 414 may also have micro-scale or substantially micro-scale dimensions. As a few non-limiting examples, the body 414 may have a diameter of 1.1 mm (1100 $\mu$m) and a thickness of 240 $\mu$m, or a diameter of 1.5 mm (1500 $\mu$m) and a thickness of 240 $\mu$m. It will be understood that the microfluidic check valve 400 may be incorporated in a fluidic fitting or other structure having larger dimensions that would not be considered micro-scale.

In a typical embodiment, the microfluidic check valve 400 has a nano-scale internal volume. In other words, the microfluidic check valve 400 has an internal volume on the order of nanoliters (nL), i.e. in a range of about 1000 nanoliters or less. As one non-limiting example, the internal volume is in a range from 10 nL to 100 nL, a few specific examples being 20 nL and 40 nL. In the present context, the term "internal volume" or "total internal volume" refers to the total internal volume of the microfluidic check valve 400 that fluid can occupy while flowing through the microfluidic check valve 400 and while the microfluidic check valve 400 is in the open state. Thus, in the present embodiment, the internal volume corresponds to the open-space volume collectively defined by the internal chamber 438, the inlet bore 442, and the outlet bore 446. Moreover, the microfluidic check valve 400 has a nano-scale swept volume on the order of nanoliters (nL). Because the microfluidic check valve 400 causes very little sample dispersion, the swept volume of the microfluidic check valve 400 may be substantially the same as the internal volume. For example, the swept volume may not be appreciably greater than the internal volume of the microfluidic check valve 400. Accordingly, the introduction or presence of the microfluidic check valve 400 in a fluid system may have little or negligible effect on sample dispersion.

The components of the microfluidic check valve 400, i.e. the body 414, the bosses 450, and the disk 454 are composed of a material or materials effective for withstanding high fluid pressure regimes as described herein, e.g., in a range of 100 bar or greater. Examples of such materials include, but are not limited to, metals such as palladium, and metal alloys such as nickel-cobalt alloys. In one specific yet non-limiting example, the metal alloy utilized is composed of 80% nickel and 20% cobalt. Metals such as palladium are useful for bio-compatible applications.

Generally, the microfluidic check valve 400 may be fabricated by any process suitable for accurately creating features on the small scales noted above using materials capable of withstanding the high pressures noted above. Microfabrication processes entailing material-additive process steps, material-subtractive process steps, or a combination of both, such as the type utilized in microfluidics, microelectronics, micro-electromechanical systems (MEMS), may be utilized. In one non-limiting example, the microfluidic check valve 400 is fabricated by an additive process that utilizes photolithography techniques in combination with electrodeposition of metals. In some embodiments, multiple microfluidic check valves 400 may be fabricated simultaneously as dies on a single substrate (e.g., a 4-inch wafer) and thereafter singulated from the substrate. In some embodiments, the surfaces of the microfluidic check valve 400 (particularly the inside surfaces exposed to the fluid flow) may be deactivated as part of the fabrication process, such as by applying a suitable coating or surface treatment/functionalization that renders the conduit chemically inert and/or of low absorptivity to the material. Moreover, the surfaces may be treated or functionalized so as to impart or enhance a property such as, for example, anti-stiction, hydrophobicity, hydrophilicity, lipophobicity, lipophilicity, low absorptivity, etc., as needed or desirable for a particular application. Coatings and surface treatments/functionalizations for all such purposes are readily appreciated by persons skilled in the art.

In some embodiments, the microfluidic check valve 400 may be fabricated utilizing a layer-by-layer metal deposition technique in which internal features (e.g., the internal chamber 438, bosses 450, and disk 454) are formed by depositing metal through appropriately patterned photolithographic masks. In such embodiments, the body 414 may include a plurality of material layers stacked along the valve axis C, such as two outer layers and one or more intermediate layers between the two outer layers. Referring to the example of FIG. 4, the body 414 includes a first outer layer 462, a first intermediate layer 466, a second intermediate layer 468, and a second outer layer 470. The first outer layer 462 defines the first outer surface 418, the first inside surface 426, and the inlet bore 442. The first intermediate layer 466 defines part of the lateral inside surface 434 and the disk 454. The second intermediate layer 468 defines part of the lateral inside surface 434 and the bosses 450. The second outer layer 470 defines the second outer surface 422, the second inside surface 430, and the outlet bore 446. In some embodiments, after a given layer has been deposited, additional material may be deposited on that layer and in the negative space formed thus far to provide a supporting structure for the subsequent layer to be deposited. At a later stage of the fabrication, the additional material may be removed from the negative space by an appropriate etching technique. As an example, FIG. 4 illustrates additional intermediate layers 474 and 478 remaining after adding and removing the additional material. Specifically, the additional intermediate layer 474 is disposed between the first outer layer 462 and the first intermediate layer 466, and the additional intermediate layer 478 is disposed between the first intermediate layer 466 and the second intermediate layer 468. The additional material may be a suitable metal such as, for example, copper.

The microfluidic check valve 400 may be mounted to or integrated with a variety of fluidic components such as, for example, capillary tubes, fluidic fittings, chromatographic columns (or cartridges), microfluidic chips, and the like. In addition to columns or cartridges utilized in LC applications, the microfluidic check valve 400 may be mounted to or integrated with columns utilized in supercritical fluid chromatography (SFE) and extraction cells utilized in supercritical fluid extraction (SFE).

Figure 7:
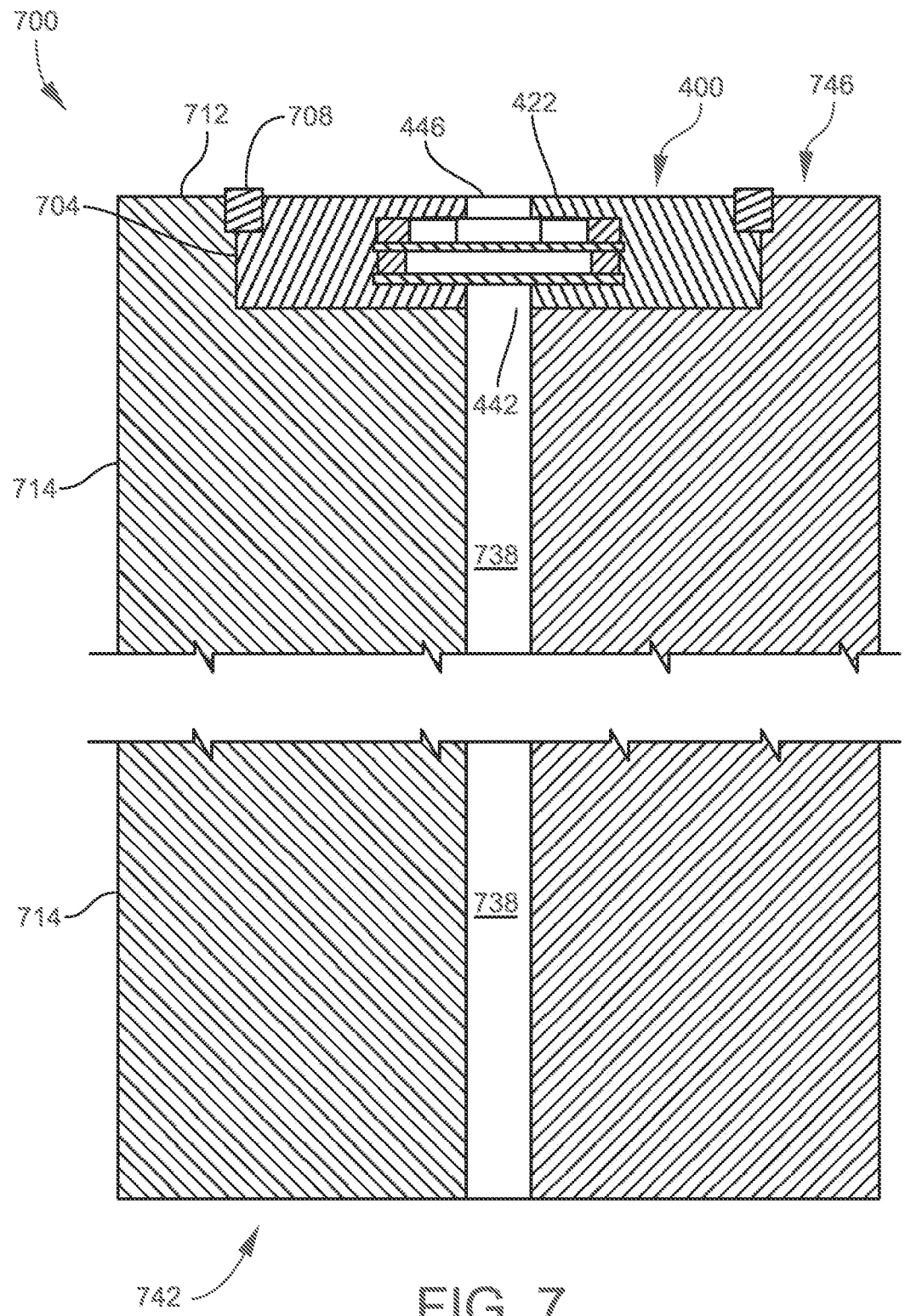
FIG. 7 is a cross-sectional view of an example of a capillary tube according to an embodiment.

FIG. 7 is a cross-sectional view of an example of a capillary tube 700 according to an embodiment. The capillary tube 700 includes an elongated capillary body 714 extending from a capillary inlet end 742 to a capillary outlet end 746, The end-to-end length of the capillary body 714 is typically much greater than the outer diameter of the capillary body 714. In FIG. 7, most of the length of the capillary body 714 is not shown, to facilitate illustration of the capillary inlet end 742 and the capillary outlet end 746, The capillary body 714 includes a capillary bore 738 extending irons the capillary inlet end 742 to the capillary outlet end 746. The capillary inlet end 742 and the capillary outlet end 746 may be coupled to respective fluidic fittings (not shown) to establish a flow path from an upstream fluidic component to a downstream fluidic component via the capillary tube 700.

A microfluidic check valve as disclosed herein, such as the microfluidic check valve 400 described above and illustrated in FIGS. 4-6, may be mounted or attached by any suitable means to the capillary inlet end 742 or the capillary outlet end 746. In the illustrated embodiment, the microfluidic check valve 400 is mounted to the capillary outlet end 746 such that the capillary bore 738 communicates with the inlet bore 442 of the microfluidic check valve 400. In other words, the capillary bore 738 is adjacent to the inlet side of the microfluidic check valve 400. In some embodiments, the capillary body 714 includes a recess 704 formed at the end of the capillary body 714 at which the microfluidic check valve 400 is located. In the illustrated embodiment, the recess 704 is provided at the capillary outlet end 746 and the microfluidic check valve 400 is disposed in the recess 704 in a secure manner. As one non-limiting example, the microfluidic check valve 400 may be laser welded to the capillary body 714 around the periphery of the recess 704, as indicated by an annular weld seam 708 in FIG. 7. In some embodiments, the recess 704 may be sized such that the second outer surface 422 of the microfluidic check valve 400 is flush (or substantially flush) with an end face 712 of the capillary body 714 at which the capillary body 714 terminates.

In another embodiment (not shown), the microfluidic check valve may be mounted or attached to the capillary inlet end 742. In this case, the capillary bore 738 communicates with the outlet bore 446 of the microfluidic check valve 400. In other words, the capillary bore 738 is adjacent to the outlet side of the microfluidic check valve 400.

Figure 8:
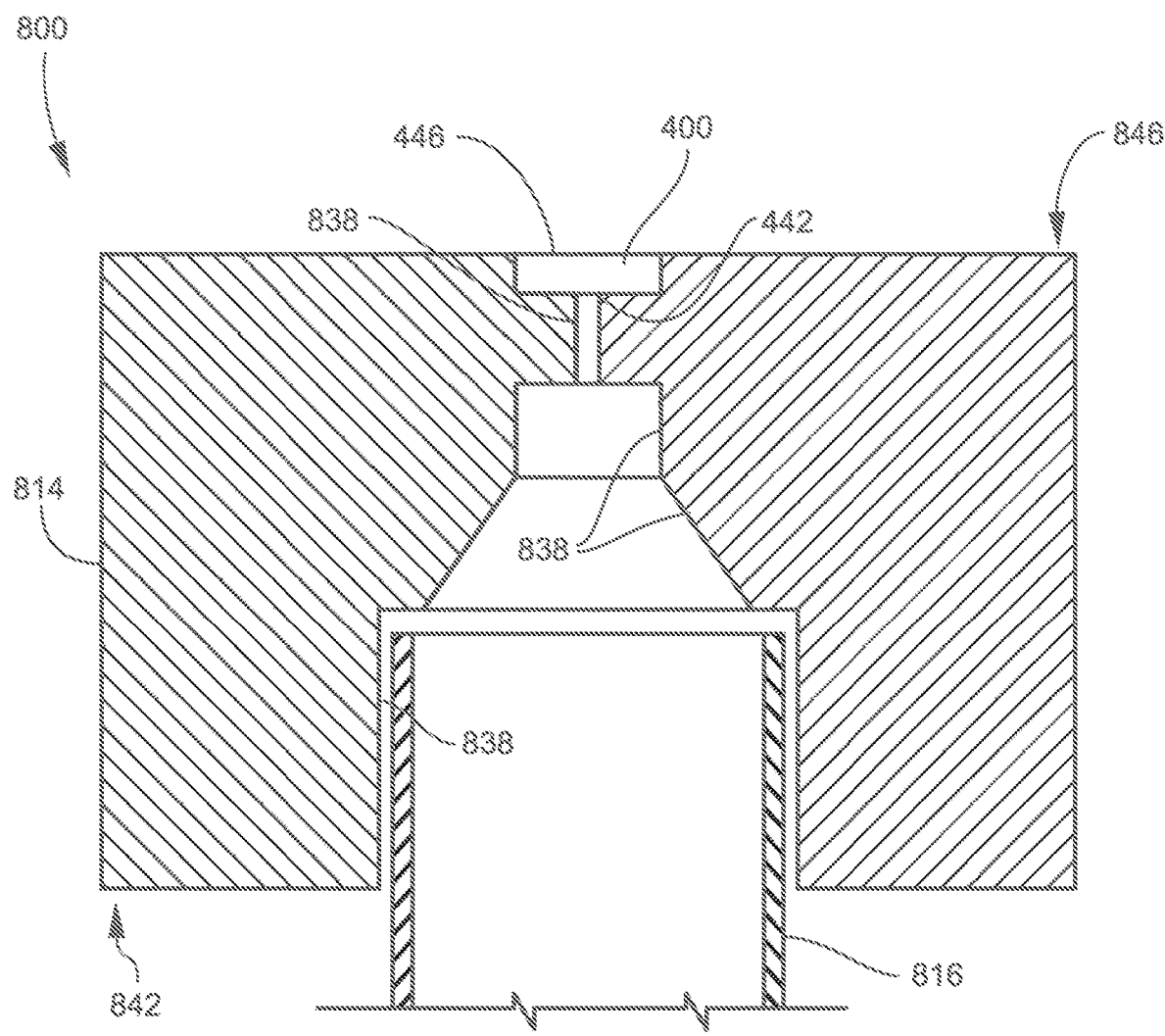
FIG. 8 is a cross-sectional view of an example of a fluidic fitting according to an embodiment.

FIG. 8 is a cross-sectional view of an example of a fluidic fitting 800 according to an embodiment. The fluidic fitting 800 includes a fitting body 814 extending from a fitting inlet end 842 to a fitting outlet end 846. The fitting body 814 includes a fitting bore 838 extending from the fitting inlet end 842 to the fitting outlet end 846. As illustrated, the diameter of the fitting bore 838 may be varied step-wise and/or gradually as needed to accommodate different fluidic components coupled to the fitting inlet end 842 and the fitting outlet end 846, respectively. A microfluidic check valve as disclosed herein, such as the microfluidic check valve 400 described. above and illustrated in FIGS. 4-6, run be mounted or attached. by any suitable means at or in (such as in a recess as described herein) the fitting body 814. In the present embodiment, the microfluidic check valve 400 is mounted at or in the fitting outlet end 846 such that the fitting bore 838 communicates with the inlet bore 442 of the microfluidic check valve 400. The fitting bore 838 may be configured for receiving a capillary tube 816 in the fitting inlet end 842, such that the capillary tube 816 communicates with the inlet bore 442 of the microfluidic check valve 400 via the fitting bore 838. The capillary tube 816 may be secured in the fitting bore 838 in a fluid-sealed manner by any suitable means, such as by utilizing glued connections, welded connections, or compression fitting components such as one or more ferrules, collets, springs, threaded connections, press-fitted connections, etc., as appreciated by persons skilled in the art.

Figure 9:
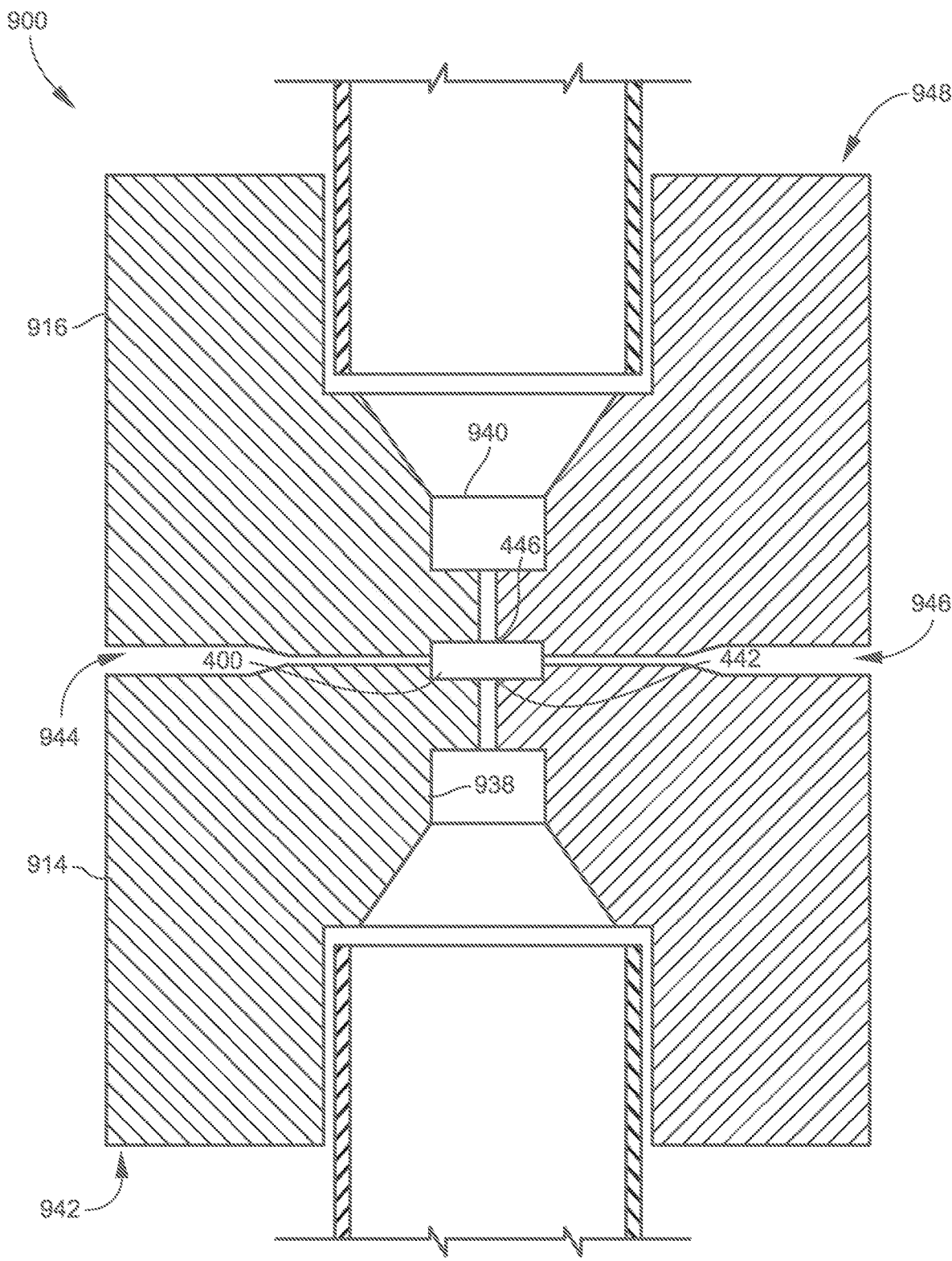
FIG. 9 is cross-sectional view of an example of a fluidic fitting according to another embodiment.

FIG. 9 is schematic cross-sectional view of an example of a fluidic fitting 900 according to another embodiment. The fluidic fitting 900 includes a first fitting body 914 extending from a first fitting inlet end 942 to a first fitting outlet end 946, and a second fitting body 918 extending from a second fitting inlet end 944 to a second fitting outlet end 948. The first fitting body 914 includes a first fitting bore 938 extending from the first fitting inlet end 942 to the first fitting outlet end 946. The second fitting body 918 includes a second fitting bore 940 extending from the second fitting inlet end 944 to the second fitting outlet end 948. As illustrated, the diameters of the first fitting bore 938 and the second fitting bore 940 may be varied step-wise and/or gradually as needed to accommodate different fluidic components coupled to the respective inlet and outlet ends of the first fitting body 914 and the second fitting body 916. A microfluidic check valve as disclosed herein, such as the microfluidic check valve 400 described above and illustrated in FIGS. 4-6, may be mounted or attached by any suitable means between the first fitting body 914 and the second fitting body 918. As one non-limiting example, the microfluidic check valve 400 may be clamped between the first fitting body 914 and the second fitting body 918. The microfluidic check valve 400 may be oriented such that the inlet bore 442 of the microfluidic check valve 400 communicates with the first fitting bore 938 and the outlet bore 446 of the microfluidic check valve 400 communicates with the second fitting bore 940. In other words, the first fitting bore 938 is adjacent to the inlet side of the microfluidic check valve 400, and the second fitting bore 940 is adjacent to the outlet side of the microfluidic check valve 400.

The fluidic fitting 900 is useful for providing a fluidic connection (e.g., a fluidic joint or union) between two other fluidic components. For example, the first fitting bore 938 may be configured for receiving a first capillary tube 916 in the first fitting inlet end 942, and the second fitting bore 940 may be configured for receiving a second capillary tube 920 in the second fitting outlet end 948. The first capillary tube 916 and the second capillary tube 920 may be respectively secured in the first fitting bore 938 and the second fitting bore 940 in a fluid-sealed manner by any suitable means. In some embodiments, the first capillary tube 916 and the second capillary tube 920 may have different diameters and/or may be composed of different materials (e.g., fused silica, metal, etc.).

Figure 10:
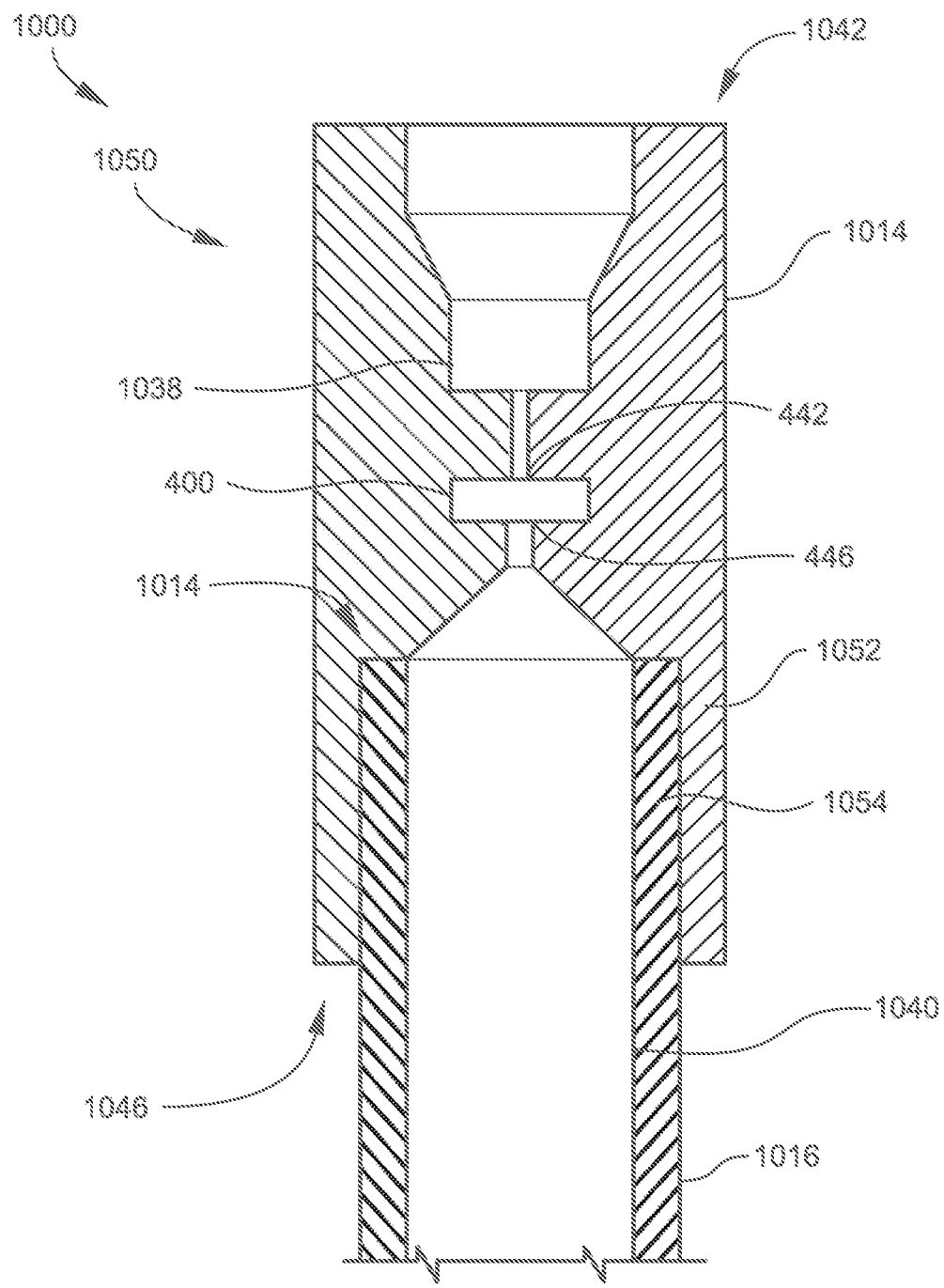
FIG. 10 is a cross-sectional view of an example of a chromatographic column according to an embodiment.

FIG. 10 is a cross-sectional view of an example of a chromatographic column. 1000 according to an embodiment. For ease of illustration, only an inlet end section of the chromatographic column 1000 is shown in FIG. 1.0. The chromatographic column 1000 also includes an outlet end section corresponding to an axial end of the chromatographic column 1000 opposite to that shown in FIG. 10. The outlet end section may be the same or substantially the same as the inlet end section. The outlet end section and most of the axial length of the chromatographic column 1000 are not shown in FIG. 10. Generally, the chromatographic column 1000 may be configured for use in analytical chromatography or preparative chromatography (e.g., purification of a sample). For example, the chromatographic column 1000 may be configured for use in LC, SFC, or SFE.

The chromatographic column 1000 includes a column body 1016 elongated along a longitudinal axis of the chromatographic column 1000. The column body 1016 includes a column inlet end 1014, a column outlet end (not shown) axially opposite to the column inlet end 1014, and an internal column bore 1040 extending from the column inlet end 1014 to the column outlet end. The column bore 1040 may contain a stationary phase (not shown) configured for performing chromatographic separation of compounds of a sample flowing through the stationary phase, as appreciated by persons skilled in the art. As also appreciated, the stationary phase is typically retained in the column bore 1040 between two porous components (e.g., frits, membranes, filters, etc.) configured to allow fluid to flow through the column bore 1040 while preventing the stationary phase from escaping the column bore 1040.

The chromatographic column 1000 further includes an inlet end cap 1050 coupled to the column body 1016 at the column inlet end 1014. The inlet end cap 1050 includes an end cap body 1014 axially extending from an end cap inlet end 1042 to an end cap outlet end 1046. The end cap body 1014 includes an end cap bore 1038 axially extending from the end cap inlet end 1042 to the end cap outlet end 1046. An axial end section 1052 of the end cap body 1014 coaxially surrounds and contacts a corresponding axial end section 1054 of the column body 1016. The inlet end cap 1050 may be securely engaged with the column body 1016 at the interface of the axial end section 1052 and the axial end section 1054 by any suitable means such as, for example, a threaded (screw) connection (e.g., a mating engagement between an internal thread of the axial end section 1052 and an external thread of the axial end section 1054), press-fitting, welding, etc. In some embodiments, the inlet end cap 1050 may be configured to be removably coupled to the column body 1016.

The chromatographic column 1000 further includes a microfluidic check valve as disclosed herein, such as the microfluidic check valve 400 described above and illustrated in FIGS. 4-6. The microfluidic check valve 400 is disposed in the inlet end cap 1050 such that the inlet bore 442 of the microfluidic check valve 400 communicates with the inlet side of the inlet end cap 1050 that receives fluid from a fluidic component (e.g., a capillary tube) coupled to the inlet side of the inlet end cap 1050, while the outlet bore 446 of the microfluidic check valve 400 communicates with the column bore 1040. By this configuration, the microfluidic check valve 400 prevents back flow and pressure pulses from the column bore 1040 through the inlet end cap 1050. As illustrated, the diameter of the end cap bore 1038 may vary along the axial length of the inlet end cap 1050 to accommodate fluidic couplings between the end cap bore 1038 and the inlet bore 442 of the microfluidic check valve 400, the outlet bore 446 of the microfluidic check valve 400, the column bore 1040, and a fluidic component (e.g., a capillary tube) coupled to the inlet side of the inlet end cap 1050. The inlet end cap 1050 may include features typically utilized in fluidic and microfluidic fittings for making fluid-sealed connections with other fluidic components, including with a capillary tube (not shown) inserted into the inlet side of the inlet end cap 1050, such as described herein or as appreciated by persons skilled in the art.

The outlet end cap (not shown) of the chromatographic column 1000, coupled to the column body 1016 at the column outlet end (not shown), may generally be the same as or similar to inlet end cap 1050 coupled to the column body 1016 at the column inlet end 1014. In a typical embodiment, however, the chromatographic column 1000 includes only one microfluidic check valve 400 that typically is disposed in the inlet end cap 1050 as illustrated, such that the outlet end cap does not include a microfluidic check valve. From the perspective of FIG. 10, the geometry of the outlet end cap is inverted in comparison to that of the inlet end cap 1050.

Figure 11:
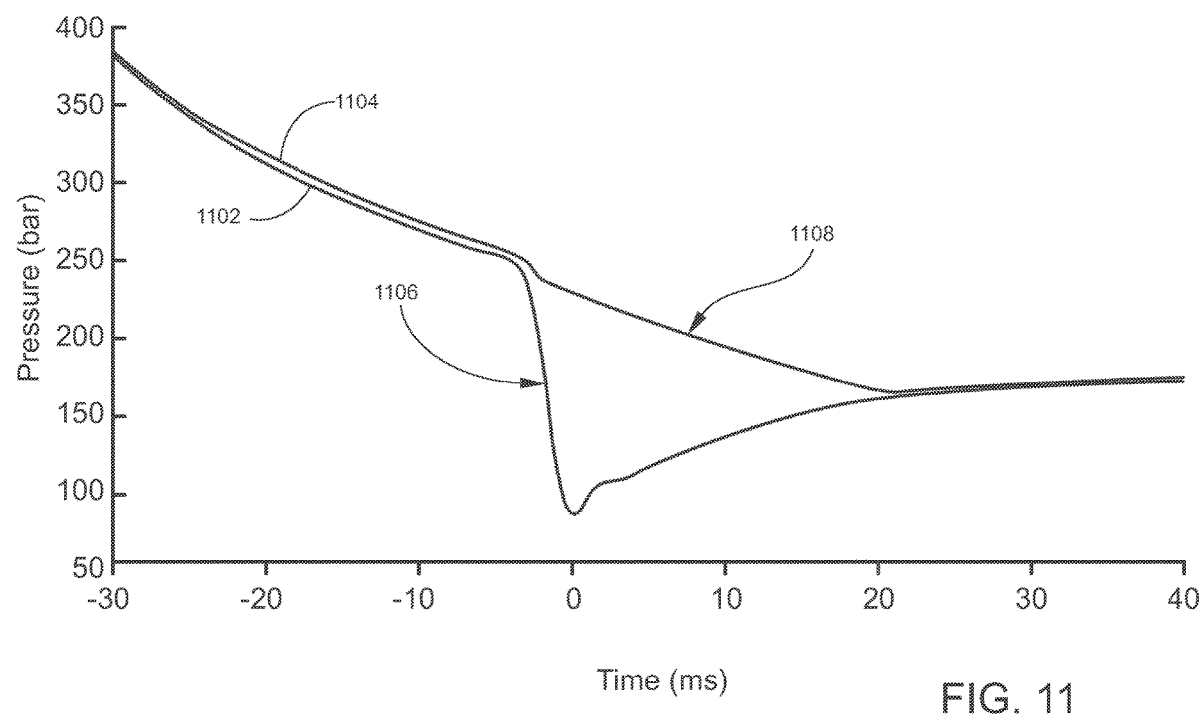
FIG. 11 is a plot of two pressure traces (pressure in bar as a function of time in ms); one pressure trace corresponding to fluid pressure measured upstream of a microfluidic check valve as disclosed herein, operatively positioned in a system consistent with that described above and illustrated in FIGS. 1-3, and the other pressure trace corresponding to fluid pressure measured downstream of the microfluidic check valve; the time period spanned by the pressure traces including the event of the microfluidic check valve switching from an open state to a closed state.

FIG. 11 is a plot of two pressure traces 1102 and 1104 (pressure in bar as a function of time in ms). One pressure trace 1102 corresponds to fluid pressure measured upstream of a microfluidic check valve 400 as disclosed herein, operatively positioned in a system consistent with that described above and illustrated in FIGS. 1-3, and the other pressure trace 1104 corresponds to fluid pressure measured downstream of the microfluidic check valve 400. The time period spanned by the pressure traces 1102 and 1104 includes the event of the microfluidic check valve 400 switching from the open state to the closed state in response to the injection valve 240 switching from the bypass mode to the main pass mode. When the injection valve 240 switches from the bypass mode to the main pass mode, a rapid drop 1106 in pressure upstream of the microfluidic check valve 400 occurs. The sample loop starts to become pressurized at time zero. Meanwhile, the pressure drop 1106 causes the microfluidic check valve 400 to move from the open position to the closed position as described above. The closing of the microfluidic check valve 400 prevents the downstream pressure from following the rapid drop 1106 of the upstream pressure. Instead, a gradual decrease 1108 in the downstream pressure occurs, until the upstream pressure (pressure trace 1102) and the downstream pressure (pressure trace 1104) reach an equilibrium. In this way, the operation of the microfluidic check valve 400 prevents back flow from the column head toward the sample loop and the deleterious effects associated with such back flow.

It will be understood that terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A microfluidic check valve, comprising:
   a body comprising an internal chamber defined by a first inside surface, a second inside surface, and a lateral inside surface;
   an inlet bore formed through the body in communication with the internal chamber;
   an outlet bore formed through the body and in communication with the internal chamber;
   a plurality of bosses disposed in the internal chamber, wherein the plurality of bosses is spaced from each other by lateral openings between adjacent bosses; and
   a disk including a planar configuration, disposed in the internal chamber, and freely movable between an open position and a closed position in response to a pressure differential between the inlet bore and the outlet bore, wherein:
   at the open position, the disk includes the planar configuration, contacts the bosses, and establishes a fluid flow path from the inlet bore, through the internal chamber including through the lateral openings between the adjacent bosses, and to the outlet bore; at the closed position, the disk includes the planar configuration, contacts the first inside surface, and blocks fluid flow from the inlet bore into the internal chamber; and
   the internal chamber, the inlet bore, the outlet bore, and the disk have respective diameters of less than 1000 micrometers.

2. The microfluidic check valve of claim 1, wherein the internal chamber, the inlet bore, and the outlet bore collectively have a nano-scale volume.

3. The microfluidic check valve of claim 1, wherein the body comprises a plurality of layers stacked along a valve axis, and wherein the plurality of layers comprises a first outer layer through which the inlet bore extends, a second outer layer through which the outlet bore extends, and an intermediate layer comprising the lateral inside surface.

4. The microfluidic check valve of claim 1, wherein the plurality of bosses is arranged in a circular pattern about a valve axis.

5. A chromatographic column, comprising:
   the microfluidic check valve of claim 1;
   a column body comprising a column inlet end and a column outlet end, and an intern column bore extending from the column inlet end to the column outlet end; and
   an inlet end cap coupled to the column body at the column inlet end,
   wherein the microfluidic check valve is disposed in the inlet end cap such that the outlet bore communicates with the internal column bore.

6. The microfluidic check valve of claim 1, wherein the body and the disk are composed of a material effective for withstanding a pressure of 100 bar or greater.

7. The microfluidic check valve of claim 6, wherein the body and the disk comprise at least one of metal, a metal alloy, a nickel-cobalt alloy, or palladium.

8. A capillary tube, comprising:
   the microlluidic check valve of claim 1; and
   a capillary body comprising a capillary inlet end, a capillary outlet end, and a capillary bore extending from the capillary inlet end to the capillary outlet end, wherein the capillary tube comprises at least one of:
the microfluidic check valve that is mounted to the capillary inlet end such that the capillary bore communicates with the outlet bore of the microfluidic check valve; or
the microfluidic check valve that is mounted to the capillary outlet end such that the capillary bore communicates with the inlet bore of the microfluidic check valve.

9. The capillary tube of claim 8, wherein the capillary body comprises a recess by at least one of the capillary inlet end or the capillary outlet end, and wherein the microfluidic check valve is disposed in the recess.

10. The capillary tube of claim 9, wherein the recess is sized such that an outer surface of the microfluidic check valve is flush with an end face of the capillary inlet end or the capillary outlet end.

11. A fluidic fitting, comprising:
the microfluidic check valve of claim 1; and
a fitting body comprising a fitting bore,
wherein the microfluidic check valve is mounted to the fitting body such that the fitting bore communicates with the inlet bore of the microfluidic check valve.

12. The fluidic fitting of claim 11, wherein the fitting bore receives a capillary tube such that the capillary tube communicates with the inlet bore of the microfluidic check valve.

13. A fluidic fitting, comprising:
the microfluidic check valve of claim 1;
a first fitting body comprising a first fitting bore; and
a second fitting body comprising a second fitting bore,
wherein the microfluidic check valve is mounted between the first fitting body and the second fitting body such that the first fitting bore communicates with the inlet bore and the second fitting bore communicates with the outlet bore.

14. The fluidic fitting of claim 13, wherein at least one of the first fitting bore or the second fitting bore receives a capillary tube such that the capillary tube communicates with at least one of the inlet bore or the outlet bore.

15. A microfluidic check valve, comprising:
a body comprising an inlet bore, an outlet bore, and an internal chamber including a first inside surface and a second inside surface;
a plurality of bosses disposed on the second inside surface, wherein the plurality of bosses is spaced from each other by lateral openings between adjacent bosses; and
a disk including a planar configuration, disposed in the internal chamber, and freely movable between an open position and a closed position in response to a pressure differential between the inlet bore and the outlet bore, wherein:
at the open position, the disk includes the planar configuration, contacts the plurality of bosses, and establishes a fluid flow path from the inlet bore, through the internal chamber including through the lateral openings between the adjacent bosses, and to the outlet bore;
at the closed position, the disk includes the planar configuration, and blocks fluid flow from the inlet bore into the internal chamber; and
the internal chamber, the inlet bore, the outlet bore, and the disk have respective diameters of less than 1000 micrometers.

16. A capillary tube, comprising:
the microfluidic check valve of claim 15; and
a capillary body comprising a capillary inlet end, a capillary outlet end, and a capillary bore extending from the capillary inlet end to the capillary outlet end,
wherein the capillary tube comprises at least one of:
the microfluidic check valve that is mounted to the capillary inlet end such that the capillary bore communicates with the outlet bore of the microfluidic check valve; or
the microfluidic check valve that is mounted to the capillary outlet end such that the capillary bore communicates with the inlet bore of the microfluidic check valve.

17. A fluidic fitting, comprising:
the microfluidic check valve of claim 15; and
fitting body comprising a fitting bore,
wherein the microfluidic check valve is mounted to the fitting body such that the fitting bore communicates with the inlet bore of the microfluidic check valve.

18. A fluidic fitting, comprising:
the microfluidic check valve of claim 15;
a first fitting body comprising a first fitting bore; and
a second fitting body comprising a second fitting bore,
wherein the microfluidic check valve is mounted between the first fitting body and the second fitting body such that the first fitting bore communicates with the inlet bore and the second fitting bore communicates with the outlet bore.

19. A microfluidic check valve, comprising:
a body including an inlet bore, an outlet bore, and an internal chamber including inside surfaces;
at least one boss disposed on one of the inside surfaces; and
a disk including a planar configuration at an open position for which the disk contacts the at least one boss and the planar configuration at a closed position,
wherein the disk is disposed in the internal chamber and is movable between the open position and the closed position in response to a pressure differential between the inlet bore and the outlet bore to respectively allow and block fluid flow from the inlet bore, through the internal chamber, and to the outlet bore, and
wherein the internal chamber, the inlet bore, the outlet bore, and the disk have respective diameters of less than 1000 micrometers.
wherein the microfluidic check valve is mounted between the first fitting body and the second fitting body such that the first fitting bore communicates with the inlet bore and the second fitting communicates with the outlet bore.

* * * * *